Sept. 8, 1936.  R. P. CLARKSON  2,053,393
MEANS FOR CREATING UNIFORM TEMPERATURE CONDITIONS IN SMALL SPACES
Filed Dec. 8, 1932  2 Sheets-Sheet 1
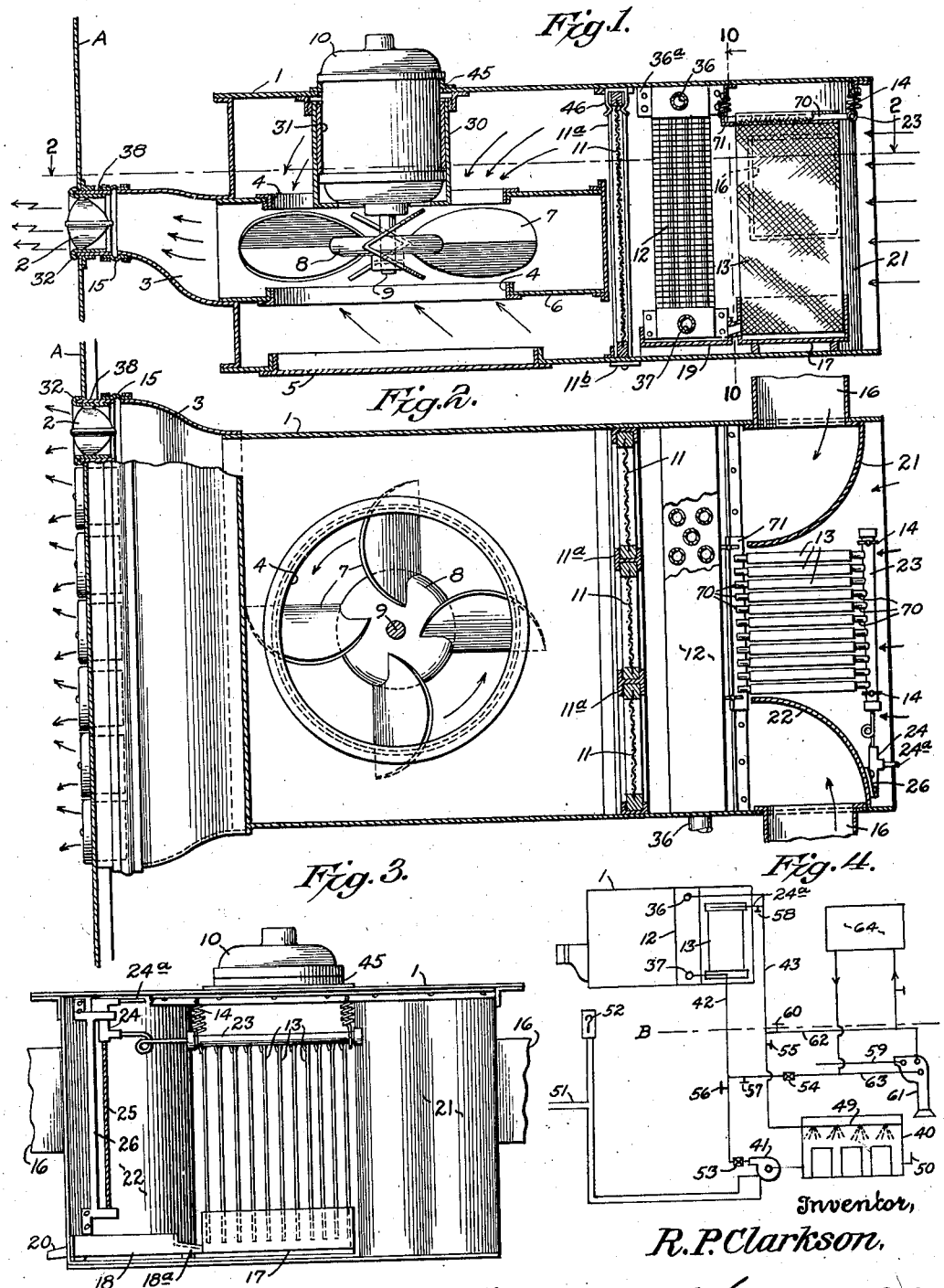
Inventor,
R. P. Clarkson,
By
Attorney.

Sept. 8, 1936.   R. P. CLARKSON   2,053,393
MEANS FOR CREATING UNIFORM TEMPERATURE CONDITIONS IN SMALL SPACES
Filed Dec. 8, 1932   2 Sheets-Sheet 2
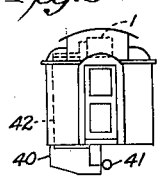
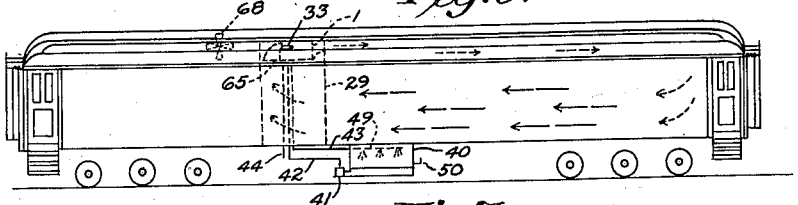
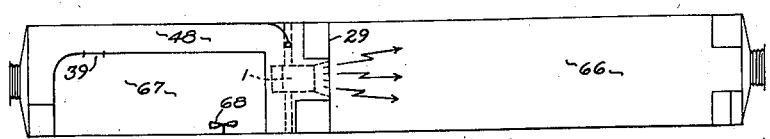
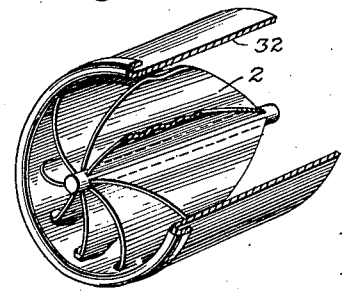
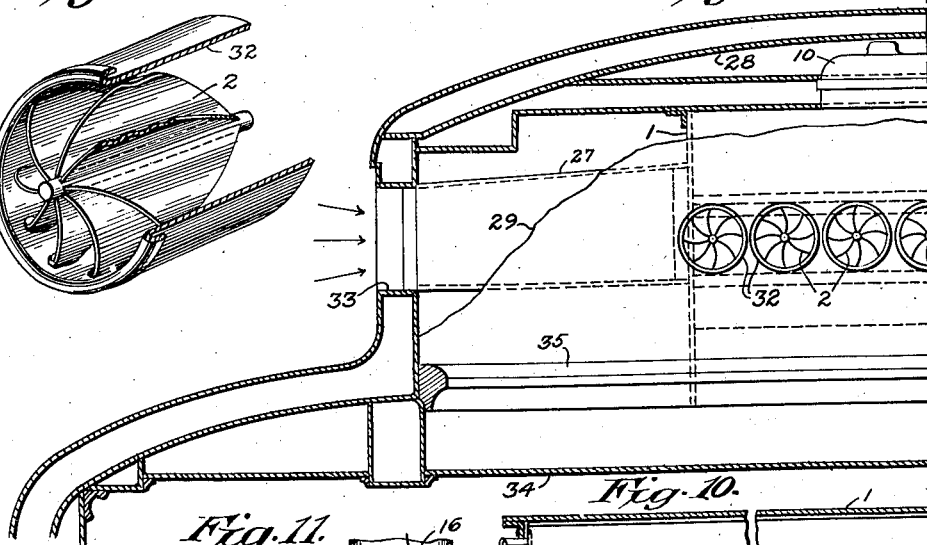
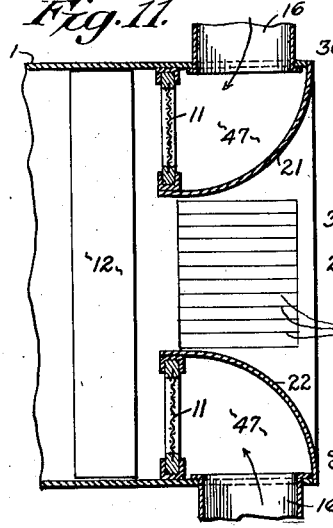
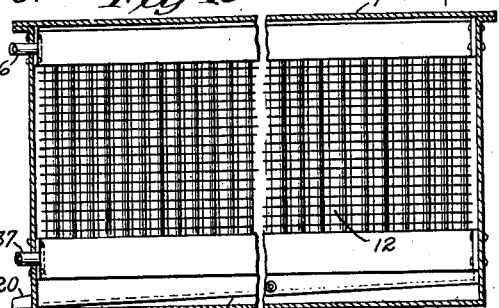
Inventor,
R. P. Clarkson,
By
Attorney Patented Sept. 8, 1936

2,053,393

UNITED STATES PATENT OFFICE 2,053,393

MEANS FOR CREATING UNIFORM TEMPERATURE CONDITIONS IN SMALL SPACES

Ralph P. Clarkson, Williamsport, Pa., assignor to J. H. McCormick & Co., Williamsport, Pa., a corporation of Pennsylvania Application December 8, 1932, Serial No. 646,243

4 Claims. (Cl. 98—10)

This invention relates to means and methods for creating uniform temperature conditions in small spaces, more particularly in railroad and similar cars and busses, by means of self-contained apparatus of the cabinet or unit type equipped with air distributing means.

An object of the invention is to distribute conditioned air into an enclosure or space from one end thereof without distribution ducts, and to provide that the temperature and humidity conditions of air within the space shall be uniform throughout the space.

Another object of the invention is to combine air distribution, ventilation, cleaning, tempering, humidification, and dehumidifying functions in self-contained cabinet or unit form for all year around operation.

Indoor comfort requires not only that the temperature of the air be regulated and a constant supply of fresh air introduced but also it is essential that the air introduced into an enclosure at any point be properly distributed to all parts thereof with sufficient turbulence to prevent stratification, thus avoiding wide differences in temperature between floor and ceiling and between parts of the enclosure near the air source and those parts removed therefrom. It is further essential to distribute the air supplied without drafts i. e., objectionable air movement in one direction across the body. At all times outdoor air, in most localities on land, needs to be cleaned to remove soot and dirt particles, and recirculated air requires similar filtering because of constant indoor manufacture of dirt and dust, as by wearing off particles of rugs and carpets, and the carrying in of dirt and dust on persons and objects.

In winter it is essential, in colder climates, to make up for the low moisture content of the air and the absorption of moisture by walls, furniture, rugs, etc.

Dry, heated air is injurious to material, to equipment and to the human tissues, because it absorbs moisture from all matter that it comes in contact with. The human tissues dry out, become irritated and inflamed with possible infection or other trouble, while material such as textiles, fabrics or rugs, become brittle, the ends of the fibres break off, form dirt, float in the air and irritate the membrane of nose and throat still more.

It is obvious that humidity conditions must be adjusted for the purpose desired. Except for industrial processes that purpose is usually the health and comfort of the individual. With air movement, much higher temperature and higher relative humidity are perfectly comfortable and give less shock to the system in passing into and from conditioned areas.

The present invention provides not only a complete air conditioning unit adapted for health and comfort in medium spaces such as railway coaches, diners, and other cars, but suitable for stores, lodge rooms, restaurants, halls and lobbies, permitting complete all year conditioning of the space, regardless of the requirements of adjacent spaces, and particularly permits the highly essential uniform air distribution within the space from one end thereof without the use of distributing ducts. Proper distribution is of maximum importance. No conditioning unit is a complete unit or satisfactory for even the smallest type of enclosures unless it provides for uniform distribution of the air and turbulence or air agitation throughout the space (1) in the interests of economy, to prevent stratification of heat layers from floor to ceiling (2) to prevent unequal zones of temperature throughout the living space with occupants near the discharge cold and those far from the discharge hot or vice versa, depending upon whether cooling or heating operation is being performed, (3) to renew the layer of air around and in contact with the body (4) to stimulate the skin, and (5) to permit maximum comfort without the shock attendant upon great temperature contrast with the outside conditions.

In many present buildings no provision for a central conditioning system is provided; in many others the nature of work in various parts of the building necessitates different regulation; in still others it would be unsafe to transfer air from one space (as a contagious ward in a hospital) to another, while in railway cars there is almost no space available or the car must be torn apart at prohibitive cost to secure space. It is for these spaces as well as for general purposes, that the conditioning units, according to this invention, are peculiarly adapted and have proved commercially acceptable.

According to another feature of the invention, a unit conditioning cabinet according to this invention combines the functions of drawing a desired proportion of fresh or outside air into a space, preferably mixing with recirculated air drawn from the space, cleaning the air drawn into the unit, tempering it by either heating or cooling, and if heated, adding moisture to the air or, by cooling part or all of the air below the dew point, removing moisture from the air, and then properly and effectively distributing the air throughout the space served, without the expense of distributing ducts. This necessitates high velocity discharge from the unit to reach distant points.

In order to provide high velocity without creating drafts in the living zones, the upper part of the space must be utilized for distribution, the gentle return air flow passing through the living space, and such air as breaks down into the living space through turbulence must not create drafts. This, in small spaces, necessitates breaking the discharge from the unit into a plurality of directionally controlled streams, causing these streams of air to whirl or rotate, in order that the room air may mix with and gradually absorb the dynamic energy of the streams, breaking down the forward motion as by the braking effect of the mass of room air, and creating a mixed turbulence of all the air, particularly above the breathing zone, in order to get uniform temperature conditions throughout the space. In many instances, as in railroad cars, a difference in temperature as high as 30° between floor and ceiling existing before installation of one of these units has been reduced to 1° or 2°, even between the floor at either end of the car and the ceiling at the opposite end.

A preferred embodiment of my invention comprises a railroad unit, for example, having a definitely proportioned fresh air intake from the roof or side ventilators; a recirculation intake above the living zone, preferably with specially calculated openings of a size to properly proportion fresh and recirculated air; a series of removable and easily cleaned air filters for taking dirt, dust, and soot from the air; a controlled humidifier where moisture may be added to the air in winter, or even in summer in arid sections, and a further degree of cleaning effected even to the extent of partially removing fumes and odors by absorption as in an air washer; an air circulating fan; and a plurality of adjustable, directional discharge nozzles which impart a whirling motion to the discharged streams of air to give greater agitation in the room and to hold each stream of air together for directional effect, somewhat as a smoke ring is held together by its whirling action.

With the foregoing and other objects in view, as will be apparent as the description proceeds, my invention resides in the combination and arrangement of parts, in the details of construction, and in the application of known laws to produce a new result, as described in this specification and particularly pointed out in the appended claims, it being understood that changes may be made in the particular embodiment of my invention within the scope of what is claimed without departing from the spirit of the invention. I intend no limitations other than those of the claims.

The invention will now be described with reference to the drawings.

Fig. 1 is a vertical sectional view of an air conditioning unit made according to this invention, said view taken substantially in the central longitudinal plane of said unit;

Fig. 2 is a horizontal sectional view taken as on the line 2—2 of Fig. 1 and looking in the direction of the arrows;

Fig. 3 is an elevational view of the rear end of the unit;

Fig. 4 is a diagrammatic layout of piping and control apparatus associated with this unit;

Fig. 5 is a diagrammatic view of the end of a railway car in which this unit has been installed;

Fig. 6 is a diagrammatic view in substantial side elevation of the railway car shown in Fig. 5 to additionally show the position of said unit in said car;

Fig. 7 is a diagram representing substantially in horizontal section the car and unit shown in Fig. 6;

Fig. 8 is a detail view partly in section of the upper half portion of a railway car in which the unit has been installed;

Fig. 9 is a perspective view with a portion broken away illustrating one of the air discharge nozzles and its associated cluster of air deflecting vanes;

Fig. 10 is a vertical sectional view taken as on the line 10—10 of Fig. 1 and looking in the direction of the arrows; and Fig. 11 is a detail and fragmentary horizontal section somewhat similar to Fig. 2 but illustrating an alternative arrangement of air filters.

Similar reference characters refer to similar parts throughout the drawings.

Referring now to Figs. 1, 2 and 3 of the drawings, a flat sheet metal cabinet 1 has supported therein a fan housing 6 which has upper and lower orifice intake rings 4, 4, through which air is drawn into the housing by a fan 7 and centrifugally discharged therefrom through a transformation 3 and a plurality of circular cross-section nozzles 32, 32, within each of which is an adjustable cluster of stationary vanes 2, such as specifically described and claimed in another copending application Serial No. 629,943 filed August 22, 1932, adapted to be adjusted to direct the air flow from the nozzle and further to induce a spiral or whirling discharge from the nozzle. A canvas or similar connection 15 is made between the transformation 3 and the outer housing 38 of the nozzle assembly.

That is to say the nozzles 32 may be fixedly mounted in a wall of the cabinet and are closely adjacent each other as seen in Fig. 8, each nozzle being substantially cylindrical in shape, and in each nozzle is disposed a readily removable cluster of air deflecting vanes mounted substantially radially upon a rod-like hub as seen in Fig. 9. These vanes are flexible or resilient, being made of very thin metal, and are each of a radial extent slightly greater than the radius of the nozzle in which the cluster is placed. Further, each vane is substantially of triangular contour so that only a small portion thereof (the tip) will engage the inner surface of the nozzle.

Therefore, in inserting a vane cluster, the cluster is given a clockwise or counter-clockwise twist, as desired, causing the tip portion of the vanes to flex in a direction in accordance with said twist, and the flex thus given the vanes causes the air stream issuing from that nozzle to be deflected or to have a circular or rotational movement in accordance with the direction of said flex. It has been found that by having each pair of adjacent nozzles contain clusters of vanes having opposite flexing, the rotations of two adjacent air streams will be opposite in direction, resulting in a positive cooperation of said streams by which they will travel forwardly from the nozzles to a greater extent than if they were of the same rotation. This cooperation may be likened to a "gearing together" of the adjacent streams as contradistinguished to a "bucking" or interference at the tangential portions of the streams, and results also in a more thorough mixing of the issuing streams with the air of the room, as well as an air discharge devoid of positive and objectionable drafts notwithstanding the high velocity of the discharge.

By having the vanes of a cluster triangularly shaped, a very small portion (tip) of the vanes frictionally engage the inner surface of the nozzle but this is sufficient to hold the cluster. Hence, each cluster is adjustable within its nozzle due to this small frictional engagement, wherefore the cluster may be shifted or tilted in a nozzle to cause the hub to assume one of several transverse positions with respect to the axis of the nozzle. This results in a variation of the lineal discharge of the issuing air stream which sometimes is found of advantage, as for instance to cause the issuing stream to avoid a pillar or other constructional or existing object in the general line of air discharge from the cabinet.

Supported in a vertical position by the cabinet 1 is a motor 10 held by dependent fingers 30 which are sound insulated preferably by cork or similar strips 31 to avoid transmission of vibration from the motor assembly to the thin sheets of the cabinet 1. Normally, the thin metal sheets of the cabinet are sprayed with body deadener material as well known in the automobile art. A collar 45, preferably insulated from the cabinet, surrounds the motor 10 and seals an opening in the top of the cabinet through which the motor, in this instance, passes. The vertical shaft 9 of motor 10 projects into fan housing 6 to receive a hub 8 of a horizontally revolving fan 7 which may be of any type. Directly below fan housing 6 in the floor of cabinet 1 is provided an access plate or door 5 through which fan 7 may be removed, or any repairs or adjustments made to the assembly.

Within the cabinet 1, preferably behind fan housing 6 and extending across cabinet 1 is a plurality of filter screens 11 slidably removable through the floor of cabinet 1, the filters operating up and down in channel guides 11a, as more clearly shown in Fig. 2. When forced upwards so that a lower plate 11b closes the withdrawal opening in the cabinet floor, the individual filter 11 is held in position preferably by a spring clip 46, or other means.

In an alternative construction, as illustrated in Fig. 11, if it is desired to filter only the outside air, for example, or other air taken in through side inlets 16, 16, filter screens 11 may be placed in a similar way simply across the fresh air intake passages 47, 47, behind the radiator 12 and not, as in Fig. 2, up forward of the radiator 12.

In the preferred embodiment illustrated in Fig. 1 behind screens 11 is located a heat exchange device, preferably a fin-type or extended surface radiator 12 of large surface compared with its physical bulk, such as shown, for example, in my Patent No. 1,886,645 dated November 8, 1932, provided with a top header tapped as at 36, for example, and a lower header with a pipe connection as at 37. Preferably, for safe handling in transportation and for support, flanges 36a, 36a, may be provided to fasten radiator 12 to the sides of cabinet 1, supporting the core and headers above the floor line of the cabinet. Below the radiator and filling an access opening in the cabinet (Fig. 10) is a drip or drain pan 19 sloping towards a lip 20, (also shown in Fig. 3) which projects from the side wall of the cabinet, slightly above the floor line. By this means condensation accumulated on radiator 12 when cooling air below the dewpoint, may drop to the drain pan 19 and run off rapidly from lip 20 to some discharge means which may be readily provided above the ceiling panel 34 of the car (Fig. 8), and there will be no accumulation of liquid to spill over with the swaying and jolting of the train.

Behind radiator 12 at the rear end of cabinet 1, preferably at each side of the cabinet, are provided fresh air intake openings 16, 16, to which may be attached lead-in ducts 27 (Fig. 8) from car ventilators or openings 33. Within the cabinet are baffles 21 and 22 (Figs. 3, 2 and 11) which separate the incoming fresh air admitted through inlets 16 from recirculated air admitted up through grille 65 through the open rear end of the cabinet. Between baffles 21 and 22 is located a humidifier comprising a plurality of absorbent wicks 13, 13, hung vertically with spaces between for the passage of the warm recirculated air over the wicks.

A steam or water supply header 23 is supported by springs 14 from the top of the cabinet, and a plurality of branch pipes 70, 70 extend horizontally from said header, one branch pipe for each wick, the branch pipes perforated to pass moisture to the wicks and closed at their far ends, said ends supported in any convenient manner as by an angle bar 71 likewise supported by springs from the top of the cabinet. The wicks are preferably formed with a hem at their upper extremities by means of which the wicks can be slipped readily onto or off of said branch pipes, and the lower ends of the wicks are disposed within a run-off pan 17 which empties into the drain pan 19. The specific construction of said header, said wicks, said branch pipes and the support therefor forms no part of this invention.

The humidity supply, whether steam or water, enters through pipe 24a, passes through a valve 24 controlled by the humidity responsive element 25, and passes to the header 23. The entire humidity control is mounted on a frame 26 preferably mounted on the baffle plate 22 so as to be in the recirculated air intake. Below the humidity control, to provide for leaks, is a drip pan 18 draining by lip 18a into pan 17 and thence to pan 19 where discharge may be made as previously described.

Turning now to Figs. 4 to 8 illustrating the installation of a unit in a railroad car, it will be observed that the entire cabinet is within the clerestory space above the living zone and adjacent the roof 28, motor 10 extending up between the carlines. The normal ceiling panel may be dropped to a position indicated at 34 and nozzles 32 extended through a bulkhead or front panel 29, relatively positioned as indicated by the line A of Fig. 1. In Fig. 8 this bulkhead or panel 29 is shown torn away at the top to reveal the cabinet 1 up against the roof carlines with motor 10 extending there-between. A moulding 35 across the front of the panel coextends with the side moulding of the car, especially where the panel 29 is an addition and not already provided as by some present partition across the clerestory space.

In a divided car, such as illustrated herewith, having passenger space 66 and another space 67, it may be desirable to condition space 67 also or, if space 67 is a kitchen, it may be desirable to better condition the corridor 48. Either or both may be accomplished by the placing of a grille, as at 39, unless a door or other opening is already present, and providing an exhaust fan, as at 68, thus increasing the existing flow due to excess pressure in the car.

For cooling operation, using ice, preferably an ice bunker 40 is suspended below the car, either by removal of a present supply box or in space otherwise provided, and a suitable pump 41, electrically driven from the car supply, mounted adjacent the ice bunker and connected to the sump of bunker 40. A supply riser 42, preferably insulated and of ample capacity, connects the pump discharge with the bottom connection 37 of radiator 12 and a return 43, also insulated, passes downwardly to a series of sprays or openings 49 which spray the return water over the ice stored in bunker 40, melting the ice and cooling the water which passes to the sump and provides a supply for pump 41. Preferably pump 41 is as low as the sump to present a continual "drowned" condition and avoid the need of priming. An overflow 50 may be provided to maintain a water level in the bunker 40 and prevent water spillage over the door sills. A drain pipe 44 is also provided to discharge any flow from the unit into the drain installed over the ceiling panel.

In the discharge line 42 from pump 41 is preferably positioned a check valve 53 to avoid water flowing back through the pump and out of overflow 50, when the pump is stopped, as by the thermostatic control 52. This thermostat 52 is preferably positioned in the passenger space 66 on a side wall, for example, near the longitudinal center and at eye-height from the floor, represented by the dash line B, Fig. 4. The thermostat 52, either direct acting or through the usual relay, opens the circuit from the voltage supply 51 to pump 41 whenever the temperature in space 66 falls to a predetermined setting.

Heating supply may be from the steam line 59 of the train. This is normally at a relatively high pressure and therefore is passed through a vapor regulator 61 in the great majority of cars to reduce the pressure and for other reasons connected with car installations. For our purpose, steam supply at reduced pressure, even vapor pressure, passes from the regulator 61 preferably by way of an existing steam line 62 to the water return line 43 and thence to the upper header at 36, condensate returning by way of the water riser 42 to an existing steam return pipe 63 back to the regulator 61, which acts also as a return line trap. A separate drip trap may be preferred. When an extremely high steam pressure exists, then radiator 12 is used strictly for cooling, and a substantial duplicate of said radiator installed for heating only.

Thus, it is apparent that while cold water supply is to the bottom of the radiator and flows upwardly through the core, returning at a higher temperature from the top header to the sprays, steam for heating passes in the reverse direction entering at the top header and passing downwardly as it condenses, and returning to the trap from the bottom header. In the steam return line 63 is preferably placed a check valve 54 to avoid steam exhausted from other connected heating equipment, such as a steam jacketed water heater 64, backing up through the return line 63.

In order to close the cold water lines when heating operation is employed, valves 55 and 56 are located in the water return and supply lines respectively, just below the steam line connections. Also, to close off the steam lines during cooling operation, valves 57 and 60 are placed in the steam return and supply lines, respectively. Valve 60, however, has a further purpose, being located in the steam supply line and preferably extending through the floor of the car at some convenient point where it may be manually or thermostatically actuated to control the temperature of the car. Thus, it is apparent that during cooling operation temperature is electrically controlled by a thermostat 52 and during heating operation temperature may be controlled by a valve 60. A further method of control comprises a definite setting of the supply valve 60 for maximum steam and adjustment of return line valve 57 to control the rate of flow of the condensate.

Aside from the automatic control of humidity by the responsive element 25, a valve 58 is provided in line 24a, preferably between the header 23 and the steam supply pipe, to enable the humidifier to be shut off.

The operation of the unit may be briefly set forth as follows:

In summer months or whenever cooling is desired, no steam is required and steam line valves 57 and 60 may be closed, water shut-off valves 55 and 56 being opened. A charge of ice, preferably broken into cakes of 25 to 50 pounds, is loaded into the ice bunker 40, a few gallons of water are put into the bunker and the service switches are closed. If the space temperature is above the setting of car thermostat 52, the pump motor circuit is then complete and the pump will draw the water from the bunker 40, force it up through the heat absorption radiator 12, the flow from bottom to top causing an even distribution through the various water passages to the top header, and the water then flows back to the sprays 49 where it is spread over the ice, is cooled and returns to the sump. This cycle continues until the car temperature falls below the setting of thermostat 52 and the latter opens the pump circuit and the pump stops. The water ceases to flow, except for such water as may drop through gravity and pass out the sprays. Check valve 53 prevents all of the water of the system flowing back through the pump, raising the water level in the sump and wasting through the overflow 50.

When the service switches are thrown, current is also supplied to fan motor 10 and the fan 7 starts to revolve, quickly coming up to speed and drawing fresh air in through side ventilators 33, ducts 27, and cabinet intakes 16. Recirculation air is withdrawn from the living space up through grille 65, through the rear end of cabinet 1, over the humidifier wicks 13 which in most instances are dry, valve 58 being shut. The proportions of fresh and recirculated air are determined by the size of the inlet openings and the proportioning of the suction area by baffles 21 and 22. Normally these proportions give 25% of outdoor air and 75% of air withdrawn from the living space. The air mixes somewhat in passing through radiator 12 in contact with the cold tubes, core and fins, mixes still further in the space between radiator 12 and filter screens 11, and is filtered of dirt, dust, cinders, and suspended matter in passing through the screens 11. The air then passes into the fan housing 6 through the upper and lower orifice rings 4, 4, drawn by the positive intake action of fan 7. By centrifugal action the air is forced out of housing 6 through the transformation 3 and the canvas boot 15 to the nozzle assembly 38 and out of the individual nozzles 32, the various whirl clusters being positioned to properly direct the issuing whirling air streams. The distribution throughout the length of the car is indicated in Figs. 6 and 7 by the arrows, the return flow being backward through the living zone. All ventilators, windows, and doors are closed and with the added volume of outdoor air a slight interior pressure is built up within the car, causing outward filtration through cracks and crevices and preventing infiltration of dust at these points.

As before stated, if an exhaust fan 68 is provided for the compartment 67, and an opening or grille as at 39, the action of this fan combined with the slight positive pressure within the car, will cause a flow of some of the return air down through the corridor 48, through opening 39 and throughout the compartment 67.

In arid sections humidity may be added to the ultra-dry air passing over the wicks 13. This may be done by opening valve 58, permitting a flow of the return water through pipe 24a and header 23 down over the stretched absorbent material of the wicks 13. Not only will this add moisture to the air, but also by evaporative cooling action, will aid in temperature reduction, a drop of slightly over 8° F., dry bulb temperature, being possible when 1 grain of moisture is absorbed per cubic foot of air.

As shown in the modification of Fig. 11, simply the air drawn through opening 16 may be filtered, if desired.

In heating operation, as in winter, valves 55 and 56 may be closed and valves 57 and 60 opened. With similar action of the fan and distribution means as already described, and a similar cycle of air passage, there is a heating effect instead of cooling effect as now steam is supplied from pipe 62 through the control valve 60 and enters the top of the radiator 12, passes down through the various passages or tubes, heating up the fins, tubes, and core. The intake air, passing over the heat transfer surface, absorbs heat and causes condensation of the steam, the condensate passing out through valve 57 and pipe 63 and the drip trap. Regulation of valve 60, manually or otherwise by any well known means, will determine the amount of steam supplied and regulate the heating effect. When humidity is desired, valve 58 may be opened and steam admitted to the header 23 and into the space occupied by the wick assembly, condensate saturating the wicks 13 over which the air passes and picks up the moisture.

Necessary cleaning of filters 11 may be conveniently accomplished from time to time by slidably removing them through the floor of the cabinet and brushing them off or passing a vacuum cleaner over them to extract the dirt.

It will be apparent to those skilled in the art to which this invention appertains, that on cooling operation, if the temperature of the radiator 12 is maintained low enough to cool the air below the dew point, dehumidification will take place, the amount of moisture abstracted being dependent, among other things, on how far below the dew point the air temperature is lowered. With a given requirement for fresh air for ventilation purposes, the required dehumidification may be such as to demand reduction of the air to a temperature so low that its discharge temperature may be too low for introduction into a small space without reheating. I have discovered that it is possible to avoid reheating operation in most instances by adjustment of the flow areas through the radiator, as by spacing of tubes and fins or the area of cells in a cellular core, together with adjustment of the thickness of core in the direction of air flow, that the proportion of air which contacts the fins and other transfer surface may be whatever proportion of the total air as may be necessary to reduce the humidity to the desired point and yet permit a discharge temperature from the nozzles sufficiently high to avoid any cold currents within the living space. In other words, some currents of air pass directly through the radiator with no cooling, except by contact with cold currents of air. Other portions of air contact heat transfer surfaces for a short period and others for a longer period. Sufficient moisture may be abstracted from a portion of the air so that when mixed with the remainder, the humidity requirements are met but the temperature is not too low, the various air temperatures averaging up to the desired output temperature. It is apparent that such a mixed discharge will not be 100% saturated, as is always the result of reducing all air below the dew point and then discharging at the lower temperature. While the total moisture carried into the car in both cases may be the same, the objectionable clamminess of cold, saturated air is avoided and, as before stated, the possibility of cold currents of air is eliminated. I have found that cooling of a car to a uniform temperature throughout of 72° may be accomplished satisfactorily with nozzle discharge temperatures as high as 60°, and the distribution which is given by the method herein described.

It will be observed that my invention is not limited to the specific constructions illustrated, although I have endeavored to set forth the best mode of embodying the same known to me, but that other and eqivalent devices may be employed within the limits of the appended claims.

What I claim is:

1. In a system for air distribution means for suitably conditioning air for supply to a space; and means for discharging the conditioned air into said space in a plurality of adjacent cooperating streams having opposite rotating motion, said discharge means comprising a plurality of nozzles each provided internally with air deflecting vanes, the inclination of the vanes of two adjacent nozzles being oppositely directed.

2. In an apparatus of the class described the combination of a cabinet provided with walls; means in said cabinet for suitably conditioning the air of an occupied space and placing the same in circulation; and means to discharge the conditioned air from said cabinet in streams, the discharge means comprising a plurality of closely adjacent air discharge nozzles fixedly mounted in a wall of said cabinet, each nozzle having therein a cluster of flexible air deflecting vanes, the vanes of two adjacent nozzles reversely flexed to impart to the issuing air streams cooperating opposite rotation.

3. In an apparatus of the class described the combination of a cabinet provided with walls; means in said cabinet for suitably conditioning the air of an occupied space and placing the same in circulation; and means to discharge the conditioned air from said cabinet in streams, the discharge means comprising a plurality of closely adjacent substantially cylindrical air discharge nozzles fixedly mounted in a wall of said cabinet, each nozzle having therein a readily removable cluster of resilient air deflecting vanes, extending substantially radially from the axis of said cluster, the radial extent of each vane in a cluster being greater than the radius of its associated nozzle whereby the outermost portion of each vane will arcuately flex and frictionally engage the inner surface of the nozzle when the cluster is inserted therein, the vanes of two adjacent nozzles reversely flexed to impart to the issuing air streams cooperating opposite rotation.

4. In an apparatus of the class described the combination of a cabinet provided with walls; means in said cabinet for suitably conditioning the air of an occupied space and placing the same in circulation; and means to discharge the conditioned air from said cabinet in streams; the discharge means comprising a plurality of closely adjacent substantially cylindrical air discharge nozzles fixedly mounted in a wall of said cabinet, each nozzle having therein a readily removable cluster of resilient air deflecting vanes, said cluster comprising a hub and a plurality of said vanes supported thereby, said hub adjustable transversely of the axis of the nozzle whereby to vary the lineal direction of the air discharge from the nozzle, the vanes of a cluster extending substantially radially from the axis of said hub, the radial extent of each vane in a cluster being greater than the radius of its associated nozzle whereby the outermost portion of each vane will arcuately flex and frictionally engage the inner surface of the nozzle when the cluster is inserted therein thereby causing the air discharged from the nozzle to have a rotating motion, the vanes of two adjacent nozzles reversely flexed to impart to the issuing air streams cooperating opposite rotation.

RALPH P. CLARKSON.